United States Patent [19]

van Zon

[11] 4,148,495

[45] Apr. 10, 1979

[54] SEALING MEANS FOR A MEMBRANE FILTRATION UNIT

[75] Inventor: Cornelis van Zon, Zwolle, Netherlands

[73] Assignee: Wafilin B.V., Em Zwolle, Netherlands

[21] Appl. No.: 898,441

[22] Filed: Apr. 20, 1978

[30] Foreign Application Priority Data

Apr. 21, 1977 [NL] Netherlands ................. 7704385

[51] Int. Cl.² .................. F16L 35/00; F16J 15/04
[52] U.S. Cl. ................... 277/115; 277/110;
277/117; 285/137 R; 285/55; 285/334.2;
285/334.3
[58] Field of Search ............ 277/102, 110, 111, 115,
277/117, 118, 190, 191, 212 F; 285/334.2, 137
R, 354, 55, 398, 371, 334.3

[56] References Cited

U.S. PATENT DOCUMENTS

| 1,989,614 | 1/1935 | Halpern et al. | 285/55 |
| 2,328,468 | 8/1943 | Laffby | 285/334.2 |
| 3,062,565 | 11/1962 | Word | 284/334.2 X |
| 3,228,096 | 1/1966 | Albro | 285/55 X |
| 3,338,598 | 8/1967 | Kurtz | 285/334.2 X |

FOREIGN PATENT DOCUMENTS

| 969600 | 7/1958 | Fed. Rep. of Germany | 285/334.2 |
| 194446 | 2/1965 | Sweden | 277/115 |

Primary Examiner—Robert S. Ward, Jr.
Attorney, Agent, or Firm—Wigman & Cohen

[57] ABSTRACT

Connection of membrane support tube supporting a filtration membrane and another tube path, both being provided with conical recesses and a double conically shaped sealing ring sealingly engaging the conical recesses, while a sleeve integral with the ring sealingly engages the membrane. The end faces of the support tube and the other tube part are free from sealing engagement with sealing material.

13 Claims, 5 Drawing Figures

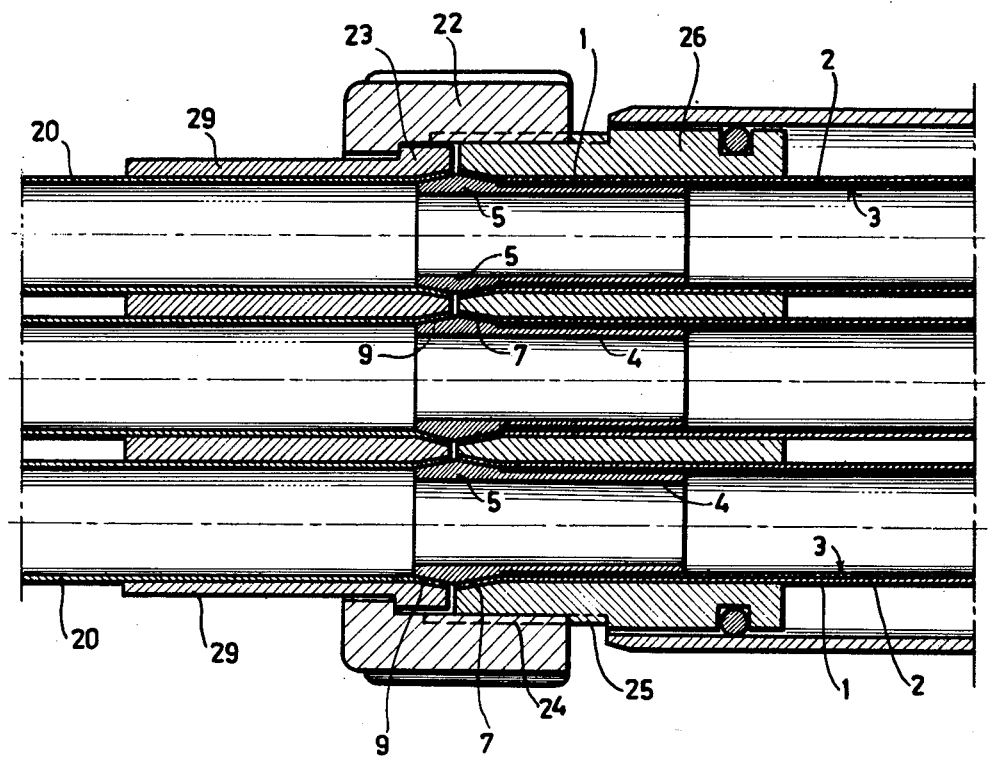
FIG:2.

SEALING MEANS FOR A MEMBRANE FILTRATION UNIT

BACKGROUND OF THE INVENTION

The invention relates to a connection of a membrane assembly support tube supporting a filtration membrane with another pipe part, in particular a bend. Connections of a membrane support tube supporting a filtration membrane with another pipe part, in particular a bend, are known.

A connection is for instance known, whereby the seal consists of a sleeve of elastomeric material, which extends to within the support tube and co-operates with the filtration membrane, which sleeve has a flange at its end, which extends at least along the end face of the membrane support tube.

This known connection often presents the disadvantage that the seal is insufficient or that there are difficulties when mounting the sleeve with a flange of elastomeric material.

Similar difficulties are observed in a connection of a membrane support tube supporting a filtration membrane having a bend as another pipe part, whereby the support tube and the other pipe part each are provided with an end recess conically widening toward the end face of the bend, the assembly support tube respectively, having a sealing ring with at least two end faces, whereby the outer shape as seen from the centre, conically tapers toward the end faces corresponding to the conical contours of the recesses. Said sealing ring comprises a sleeve of an elastomeric material which extends to within the assembly support tube and co-operates with the filtration membrane.

SUMMARY OF INVENTION

The invention aims to provide a connection whereby mounting the sealing ring can take place very easily.

Another object of the invention is to exclude any risk of imperfect sealing.

Said aim is achieved according to the invention in that a connection of a membrane assembly support bearing a filtration membrane with another tube part, in particular a bend, whereby said assembly support tube and the other tube part each present an end recess conically widening toward the end face of the other tube part, the assembly support tube respectively and being provided with a sealing ring, which conically tapers at the outer side from the centre to each of the ends, corresponding to the conical direction of the recesses, which sealing ring is provided with a sleeve of elastomeric material which extends to within the assembly support tube, and co-operates with the filtration membrane; an end face or end faces of the membrane assembly support tube being situated substantially free with respect to the sealing ring material.

A sealing ring of this type is easily to be mounted, whilst the seal is always immaculate.

The conical wall of the assembly support tube recess expediently adjoins an end face of a support tube recess, said end face situated remote from the nearest end of the membrane assembly support tube and being also remote from the end face of the sealing ring directly facing said end face.

In this manner a good fixation of the sealing ring in the connection is obtained, so that the sealing ring cannot possibly be dragged away, when high flow velocities occur in installations where connections of this type are applied.

The conical wall of a recess in the other tube part appropriately adjoins a recess end face situated remote from the nearest end of the tube part, which recess end face is situated at least partially remote from the sealing ring end face directly facing the same.

In this manner a further improvement is obtained with respect to fixation of the sealing members.

The distance between the recess end face and the end face of the support tube recess appropriately exceeds the distance between the end faces of the sealing ring when the end faces of the support tube and of the other tube part engage each other.

According to an expedient embodiment a very good centering of the sealing ring is obtained when the end face of the assembly support tube and of the other tube part, in particular a bend, are interspaced in the finished connection.

According to a very preferred embodiment the free end of the sealing sleeve within the tubular filtration membrane, appropriately has an outer diameter which exceeds the one of a part of the sleeve situated thereabove.

In this manner it is contrived that the end parts of the sealing sleeve better co-operate with the filtration membrane than the parts of the sealing sleeve thereabove. Thereby not only an extremely good seal is obtained, but furthermore no danger is involved of stripping of the end part of the sealing sleeve at extremely high flow velocities of liquid through the inner sides of the tubular filtration membrane.

In a very appropriate embodiment the end of the sealing sleeve disposed within the tubular filtration membrane, widens toward the free end of the sealing sleeve. Thus it is achieved that an optimum seal is produced whilst there is no danger of turning or stripping of the sealing bush part within the sealing member.

Advantageously the abovementioned advantages can be appropriately be attained by the fact that the end of the sealing sleeve within the tubular filtration membrane has a smaller wall thickness than the part of the sleeve situated thereabove. Owing to said smaller wall thickness the sleeve can be better adapted to the surface of the membrane with which this end part co-operates so that an optimum seal is ensured. In some cases, however, it is to be recommended to choose the materials of the sealing sleeve such that the end parts of said sleeve cannot possibly turn or strip when high flow velocities and small wall thicknesses of the end part of the sealing sleeve are used.

The wall thickness of the end part of the sleeve with a greater outer diameter, appropriately decreases toward the end of said sleeve.

It will be obvious, that under said circumstances an extremely good seal is ensured.

The sleeve expediently comprises circular sealing ribs, so as to improve the seal and to make the sealing sleeve rigid.

It is further to be recommended that the outer diameter of the annular ribs is substantially equal to the outer diameter of the free end of the sealing sleeve, disposed within the filtration membrane.

The sealing sleeve is appropriately provided with a flange having an outer diameter which exceeds the diameter of the sleeve and the circular sealing ribs, such that the flange at least covers the end face of the filtration membrane of the porous non-woven tubes and of a support tube. At least the lower side of the flange preferably comprises projections.

BRIEF SURVEY OF THE DRAWINGS:

FIG. 1 shows a longitudinal cross sectional view of a first embodiment of a connection in accordance with the invention;

FIG. 3 shows a connection of a membrane assembly support tube with the bend, like shown in FIG. 2, on an enlarged scale;

DESCRIPTION OF PREFERRED EMBODIMENT

Figure 2:
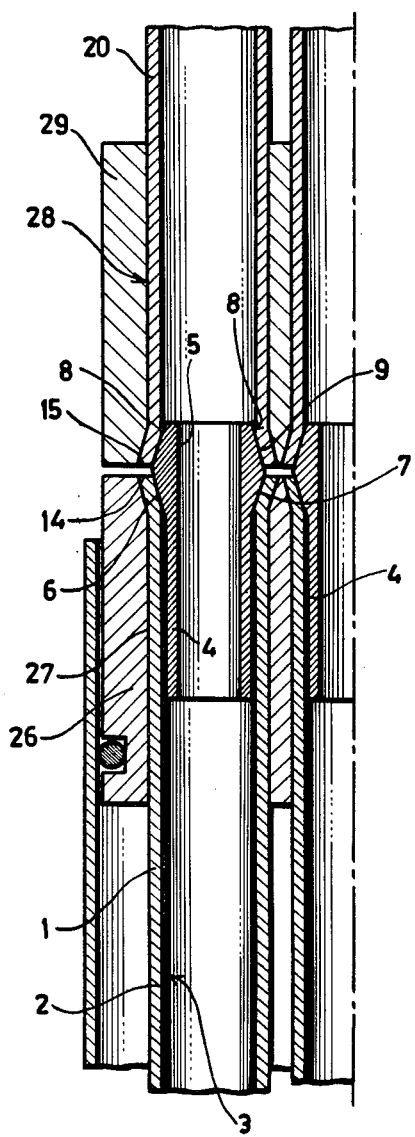
FIG. 2 shows another embodiment, comprising a plurality of membrane assembly support tubes and a bend adjoining each membrane assembly support tube.
Figure 5:
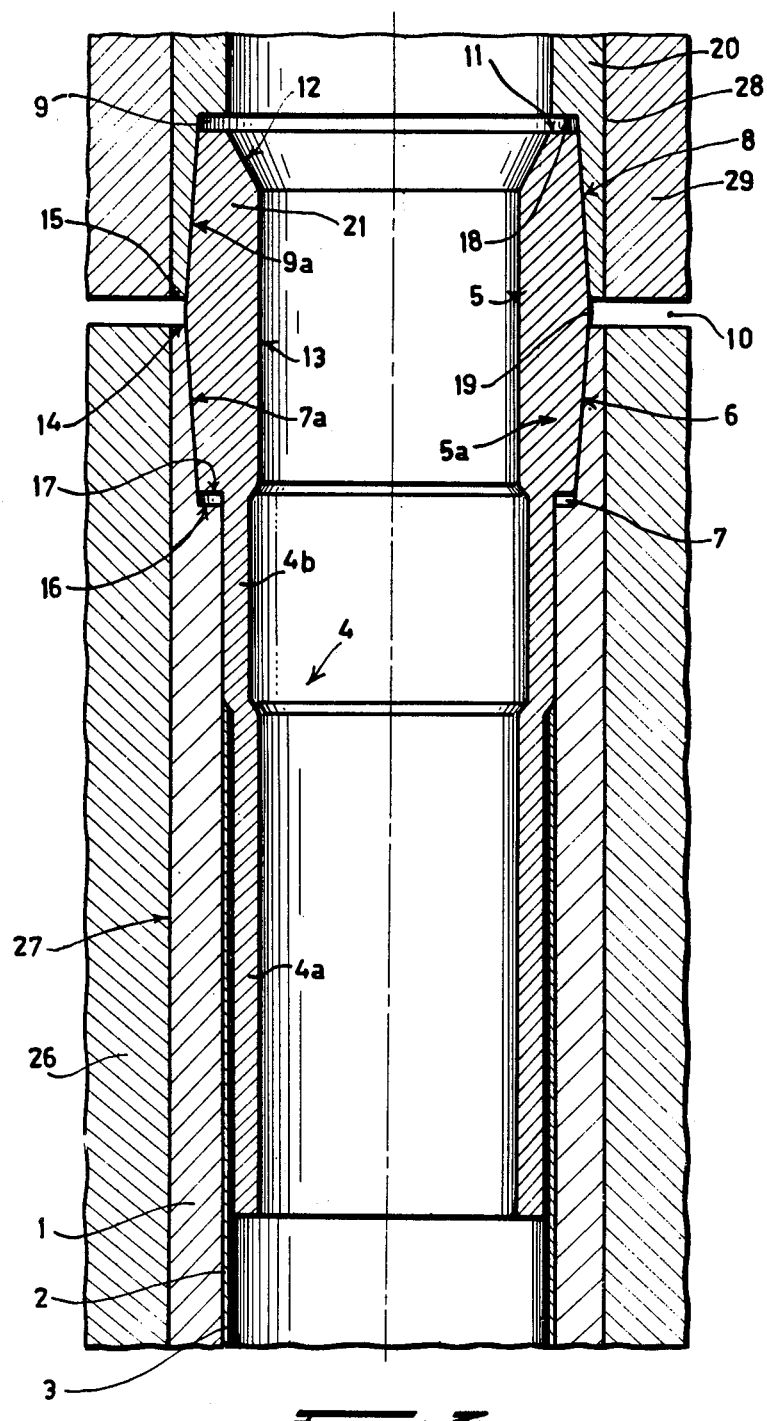
FIG. 5 shows a view of a sealing means according to FIG. 4.

FIG. 1 shows a membrane assembly support tube 1, supporting an assembly of an internal non woven tube 2, provided with a filtration membrane 3. Said non woven tube 2 serves to discharge any liquid passing through filtration membrane 3.

The membrane assembly support tube 1 has a conical recess 7 at its upper side which widens towards the end face 14 of said membrane assembly support tube 1.

The bend 20 is likewise provided with a conical recess 9 widening toward the end face 15 of said bend.

The outer side of sealing ring 5 presents likewise a double conical shape, such that the outer surface 6 of the sealing ring 5 is able to co-operate with the inner surface of the conical widening 7 directed toward the outer end, whereas the conical surface 8 of the sealing member co-operates with the inner surface of the conical widening 9 which is at the end of the bend 20.

As can be seen, the sealing ring comprises a sleeve 4, engaging the inner surface of the filtration membrane 3.

To that end the outer periphery of the sleeve 4 of elastomeric material somewhat exceeds the inner diameter of the filtration membrane 3.

By keeping the end faces 14 and 15 of the membrane assembly support tube and the bend remote from each other, a very good fixation of the sealing member can be obtained.

A still better fixation of said sealing member is achieved in the embodiment of FIGS. 2 and 3.

FIG. 2 shows a plurality of membrane assembly support tubes 1, which each are connected with another tube part, being a bend 20.

Intercoupling the module of the membrane assembly support tubes and the bend 20 occurs by means of coupling means comprising a coupling ring 22, which on the one hand engages a shoulder 23 at the outer side of the separate bends 20 forming a unit and extending to beyond the end faces of the bends, and on the other hand with the thickened part 25, situated on the outer side of the module of the membrane assembly support tubes 1. Thread 24 upon the coupling ring 22 cooperates with thread 25 upon the outer side of the thickened part 26. Between the end faces of the bend 20 and the membrane assembly support tube 1, a clearance 10 exists.

FIG. 3 also shows the membrane assembly support tube 1, the inner side comprising a non woven tube 2, bearing the filtration membrane 3.

The seal consists now of a sealing ring 5 being provided with a first sleeve part 4b, which co-operates with the inner side of the membrane assembly support tube, and a second sleeve part 4a, adjoining the latter, co-operating with the inner side of the filtration membrane 3. This embodiment ensures an optimum seal.

The outer diameter of the sleeve part 4a advantageously exceeds the inner diameter of the tubular filtration membrane 3.

The membrane assembly support tube 1 comprises at its end a recess 7, which conically widens toward said end. The conical wall of said recess 7 adjoins the end face 16 of the support tube recess 7 being remote from the nearest membrane assembly support tube end 14, which end face 16 is also situated remote from an end face 17 of the sealing means situated opposite thereto.

The conical wall 9a of the tube part end recess 9 preferably adjoins an end face 18 situated remote from the nearest tube end part 15.

The distance between the end faces of the recesses, that is the endfaces 16 and 18 is, when the end faces 14 and 15 of the membrane assembly support tube 1 and another tube part or bend 20 are adjacent to each other, always exceeds the distance between the end faces 11 and 17 of the sealing ring 5.

In said structure the seal is obtained by engagement of the conical surfaces 6 and 8 of the rubber ring 5. When the membrane assembly support tube 1 and the other tube part 20 in the form of a bend, are moved toward each other, the conical surfaces 8 and 6 of the rubber ring 5, are firmly pressed against the wall surface of the recess 9 in the bend and the recess 7 in the membrane assembly support tube 1, so that an extremely good seal is obtained.

A great advantage of said structure is that the bend is easily to be mounted upon the membrane assembly support tube part, since the conical surfaces ensure a good centering.

If desired there may be a small clearance 10 between the end faces 14 and 15 of the membrane assembly support tube 1 and the bend 20 respectively. In this manner an extremely good fixation and mounting of the sealing ring is accomplished.

The inner side of the rubber ring 5 comprises a cylindrical face 13, so as to facilitate the transfer of liquid through the assembly of the membrane assembly support tube 1, and the bend 20.

So as to facilitate said transfer of flow, the end of the ring 5 is provided with a truncated conical surface 12, which is present upon part 21 of the sealing ring 5.

The other portion 5a of ring 5 co-operates with the conical recess 7.

Centering and fixing the sealing ring 5 is further facilitated by an edge 19 which is produced owing to adjoining the surfaces 7 and 8 of the parts 5a and 21 of said sealing ring 5.

It will be obvious that the clearance 10 should be chosen such that there will occur no important deformation by pressing the sealing ring 5 outwardly at internal high fluid pressures.

An extremely important fact in the present invention is that surface 6 of ring 5 engages a surface 27, which is integral with the assembly support tube 1, since in that manner an adhesive connection 27, if any, between the outer side of the assembly support tube 1, and a sleeve 26 fixed by an adhesive cannot possibly contact any liquid in the interior of the assembly or in the interior of the assembly support tube.

If the recess surface 7a would be in the second support tube 26 the result would be that if end face 17 would not adjoin end face 16, liquid under pressure escaping between the outer side of the sleeve 4 and the inner side of the assembly support tube 1, would directly contact the glue or adhesive connection upon the surface 27, which would involve important leakages.

The same applies to a glue or adhesive connection 28 between bend 20 and a sleeve with a shoulder 23, by means of an adhesive if surface 9a of the recess would be accomodated in the tube part 29, so that the annular surface 11, would not sealingly adjoin the recess end face 18.

Figure 4:
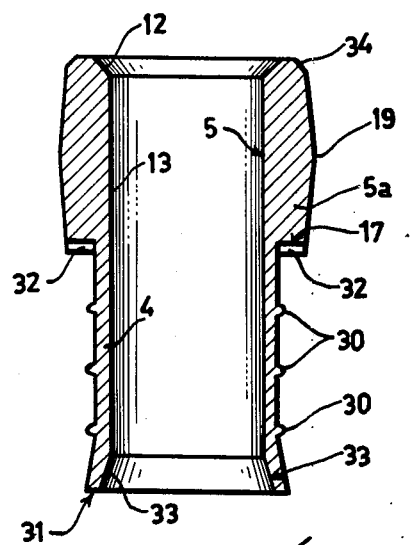
FIG. 4 shows a cross section of a preferred embodiment of a sealing means for use in a connection according to FIG. 3
Figure 5:
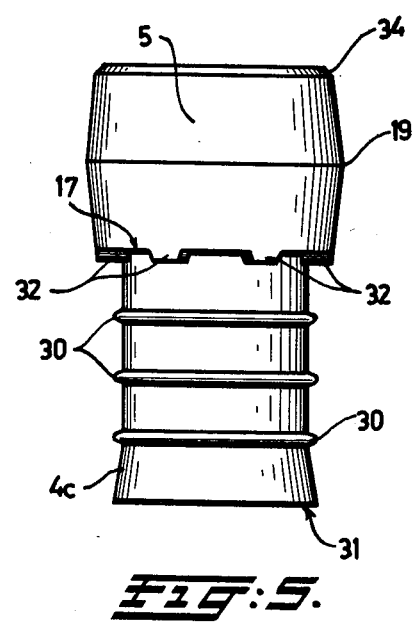

It appears that in this case a seal is formed by means of surfaces 7a and 9a and not by means of the end faces 14, 15, 16 and 18. The sealing means 5 consist preferably of a mixture of polybutene and natural rubber (50/50 by weight). According to FIG. 4 the sealing member consists of a sealing sleeve 4a, which is connected with the sealing ring 5, The end face 17 of the sealing ring 5 is to be accomodated opposite the recess end face 16.

The sealing sleeve 4 has on its outer side annular sealing ribs 30 which improve the rigidity of the sealing means and improve the sealing action.

The end portion 4c of the sealing sleeve widens conically at the outer side toward the free end 31 of the sealing sleeve.

The outer diameter at the end 31 of the sealing sleeve is substantially equal to the outer diameter of the annular sealing ribs 30.

The wall thickness of the end part 4c of the sealing sleeve appropriately decreases toward the free end 31 of the sealing sleeve, particularly by means of tapering wall 33.

This enables said end part to adapt to the membrane under the influence of pressures within said filtration membrane 3.

According to a preferred embodiment the end face 17 of the sealing ring 5 is provided with projections 32 so that even if the projections contact the recess end face 16, no sealing occurs. In this way one is sure that the sealing member is well accomodated in the recess 7.

Moreover, such a sealing member is easily removed from the mould after having formed the sealing means.

Preferably six evenly interspaced projections are used.

If desired, the upper part 34 of sealing ring 5 may also be provided with projections.

What is claimed is:

1. A connection of a membrane assembly support tube supporting a filtration membrane with another tube part, in particular a bend, whereby said assembly support tube and the other tube part each present an end recess, conically widening toward the end face of the other tube part, the assembly support tube respectively, and being provided with a sealing ring which conically tapers at the outer side from the centre to each of the ends, corresponding to the conical direction of the recesses, which sealing ring is provided with a sleeve of elastomeric material, which extends to within the assembly support tube, and co-operates with the filtration membrane, wherein an end face or end faces of the membrane assembly support tube are at least partly free with respect to the sealing ring material.

2. The connection of claim 1, wherein the conical wall of the assembly support tube recess adjoins an end face situated remote from the nearest end of the membrane assembly support tube and being also remote from the end face of the sealing ring directly facing said end face.

3. The connection of claim 1, wherein the conical wall of the recess in the other tube part adjoins a recess end face situated remote from the nearest end of the tube part, which recess end face is situated at least partially remote from the sealing ring end face directly facing same.

4. The connection of claim 1, wherein the distance between the recess end face and the end face of the support tube recess exceeds the distance between the end faces of the sealing ring when the end faces of the support tube of the other tube part engage each other.

5. The connection of claim 1, wherein the end face of the assembly support tube and of the end face of the other tube part are remote from each other in the finished connection.

6. The connection according to claim 1, wherein, when a glue connection or an adhering connection is applied in between the outer side of the assembly support tube and an additional tube, the said adhesive connection is situated beyond the periphery of the sealing ring.

7. The connection of claim 1, wherein, when an adhesive connection is applied in between the outer side of the other tube part and an additional tube, said adhesive connection is situated beyond the periphery of the sealing ring.

8. The connection of claim 1, wherein the free end of the sealing sleeve within the tubular filtration membrane has an outer diameter which exceeds the outer diameter of the sleeve part situated thereabove.

9. The connection of claim 1, wherein the end of the sealing sleeve widens toward its free end.

10. The connection of claim 1, wherein the wall thickness of the end of the sealing sleeve decreases preferably gradually toward the end of the sealing sleeve.

11. The connection of claim 1, wherein at least the end face of the sealing ring comprises projections.

12. The connection of claim 1, wherein the sealing sleeve is provided with annular ribs.

13. A sealing means for a connection of a membrane assembly support tube supporting a filtration membrane with another tube part as described in any of claims 1 to 12.

* * * * *